(12) United States Patent
Zhang et al.

(10) Patent No.: US 12,055,904 B2
(45) Date of Patent: Aug. 6, 2024

(54) METHOD TO PREDICT YIELD OF A DEVICE MANUFACTURING PROCESS

(71) Applicant: ASML NETHERLANDS B.V., Veldhoven (NL)

(72) Inventors: Youping Zhang, Cupertino, CA (US); Boris Menchtchikov, Cupertino, CA (US); Cyrus Emil Tabery, Redwood City, CA (US); Yi Zou, Foster City, CA (US); Chenxi Lin, Newark, CA (US); Yana Cheng, San Jose, CA (US); Simon Philip Spencer Hastings, San Jose, CA (US); Maxime Philippe Frederic Genin, San Mateo, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 606 days.

(21) Appl. No.: 17/293,373

(22) PCT Filed: Oct. 30, 2019

(86) PCT No.: PCT/EP2019/079691
§ 371 (c)(1),
(2) Date: May 12, 2021

(87) PCT Pub. No.: WO2020/114686
PCT Pub. Date: Jun. 11, 2020

(65) Prior Publication Data
US 2022/0011728 A1 Jan. 13, 2022

(51) Int. Cl.
*G06F 30/10* (2020.01)
*G03F 7/00* (2006.01)
(Continued)

(52) U.S. Cl.
CPC ........... *G05B 13/048* (2013.01); *G03F 7/705* (2013.01); *G03F 7/70616* (2013.01);
(Continued)

(58) Field of Classification Search
CPC .. G03F 7/70633; G03F 7/705; G03F 7/70625; G03F 7/70683; G03F 7/70616;
(Continued)

(56) References Cited

U.S. PATENT DOCUMENTS

| 5,229,872 A | 7/1993 | Mumola |
| 5,296,891 A | 3/1994 | Vogt et al. |

(Continued)

FOREIGN PATENT DOCUMENTS

| EP | 3309617 | 4/2018 |
| EP | 3312672 | 4/2018 |

(Continued)

OTHER PUBLICATIONS

VInternational Search Report and Written Opinion issued in corresponding PCT Patent Application No. PCT/EP2019/079691, dated Feb. 5, 2020.

(Continued)

*Primary Examiner* — Binh C Tat
(74) *Attorney, Agent, or Firm* — Pillsbury Winthrop Shaw Pittman, LLP (57) ABSTRACT

A method for predicting yield relating to a process of manufacturing semiconductor devices on a substrate, the method including: obtaining a trained first model which translates modeled parameters into a yield parameter, the modeled parameters including: a) a geometrical parameter associated with one or more selected from: a geometric characteristic, dimension or position of a device element manufactured by the process and b) a trained free parameter; obtaining process parameter data including data regarding a (Continued)

process parameter characterizing the process; converting the process parameter data into values of the geometrical parameter; and predicting the yield parameter using the trained first model and the values of the geometrical parameter.

20 Claims, 3 Drawing Sheets

(51) Int. Cl.
  *G05B 13/02* (2006.01)
  *G05B 13/04* (2006.01)
  *G06F 30/27* (2020.01)
  *G06N 3/045* (2023.01)
  *G06N 3/08* (2023.01)
  *G06F 119/02* (2020.01)
  *G06F 119/22* (2020.01)

(52) U.S. Cl.
  CPC ..... *G03F 7/706837* (2023.05); *G05B 13/027* (2013.01); *G05B 13/042* (2013.01); *G06F 30/10* (2020.01); *G06F 30/27* (2020.01); *G06N 3/045* (2023.01); *G06N 3/08* (2013.01); *G06F 2119/02* (2020.01); *G06F 2119/22* (2020.01)

(58) Field of Classification Search
  CPC ........ G03F 9/7003; G03F 1/36; G03F 7/7065; G03F 7/70441; G03F 7/70508; G03F 7/20; G03F 7/70125; G03F 7/70525; G03F 1/70; G03F 7/70516; G03F 7/70641; G03F 1/24; G03F 7/70483; G03F 7/7085; G03F 7/70433; G03F 7/70675; G03F 1/84; G03F 7/2002; G03F 7/2004; G03F 7/70133; G03F 7/70141; G03F 7/70191; G03F 7/70283; G03F 7/70466; G03F 7/70558; G03F 7/70566; G03F 7/70775; G03F 7/70866; G03F 9/7023; G03F 1/80; G03F 7/105; G03F 7/70425; G03F 7/70491; G03F 7/70666; G03F 7/706837; G03F 7/706843; G03F 9/708; G06F 30/398; G06F 30/392; G06F 17/12; G06F 18/214; G06F 18/24133; G06F 18/2431; G06F 2119/18; G06F 2111/08; G06F 30/23; G06F 2119/02; G06F 2119/22; G06F 3/011; G06F 3/013; G06F 3/014; G06F 3/015; G06F 3/016; G06F 3/017; G06F 3/0482; G06F 30/10; G06F 30/20; G06F 30/27; G06F 30/394; H01L 22/12; H01L 2221/68368; H01L 22/34; H01L 31/20; H01L 31/18

USPC ..................................................... 716/50–56
See application file for complete search history.

(56) References Cited

U.S. PATENT DOCUMENTS

| | | | |
|---|---|---|---|
| 5,523,193 | A | 6/1996 | Nelson |
| 6,952,253 | B2 | 10/2005 | Lof et al. |
| 7,239,371 | B2 | 7/2007 | Liegl et al. |
| 8,208,140 | B2 | 6/2012 | Hulsebos et al. |
| 11,580,274 | B2 | 2/2023 | Willems et al. |
| 2004/0207824 | A1 | 10/2004 | Lof et al. |
| 2006/0016561 | A1 | 1/2006 | Choi et al. |
| 2007/0085991 | A1 | 4/2007 | Liegl et al. |
| 2010/0214550 | A1 | 8/2010 | Hulsebos et al. |
| 2011/0310393 | A1 | 12/2011 | Smirnov et al. |
| 2012/0008127 | A1 | 1/2012 | Tel et al. |
| 2015/0300965 | A1* | 10/2015 | Sezginer ............. G01N 23/207 378/86 |
| 2016/0133843 | A1* | 5/2016 | Rogers ............. H01L 21/02606 423/447.1 |
| 2016/0148850 | A1 | 5/2016 | David |
| 2017/0314913 | A1* | 11/2017 | Krishnan ............... G01N 21/00 |
| 2019/0086810 | A1 | 3/2019 | Tel et al. |
| 2020/0233311 | A1 | 7/2020 | Kubis et al. |
| 2020/0356881 | A1 | 11/2020 | Bastani et al. |

FOREIGN PATENT DOCUMENTS

| | | |
|---|---|---|
| EP | 3312693 | 4/2018 |
| JP | 2012008127 | 1/2012 |
| KR | 10-2017-0136563 | 12/2017 |
| WO | 99/49504 | 9/1999 |
| WO | 2011081645 | 7/2011 |
| WO | 2013092106 | 6/2013 |
| WO | 2015049087 | 4/2015 |
| WO | 2015101458 | 7/2015 |
| WO | 2015110191 | 7/2015 |
| WO | 2017060080 | 4/2017 |
| WO | 2017067748 | 4/2017 |
| WO | 2017140532 | 8/2017 |
| WO | 2017194281 | 11/2017 |
| WO | 2018072962 | 4/2018 |
| WO | 2018077651 | 5/2018 |
| WO | 2018/202361 | 11/2018 |
| WO | 2018202361 | 11/2018 |
| WO | 2019006222 | 1/2019 |

OTHER PUBLICATIONS

Office Action issued in corresponding Korean Patent Application No. 10-2021-7016866, dated Feb. 7, 2023.

* cited by examiner

METHOD TO PREDICT YIELD OF A DEVICE MANUFACTURING PROCESS

CROSS-REFERENCE TO RELATED APPLICATIONS

This application is the U.S. national phase entry of PCT Patent Application No. PCT/EP2019/079691 which was filed Oct. 30, 2019, which claims the benefit of priority of U.S. Provisional Application No. 62/774,488 which was filed on Dec. 3, 2018 and which is incorporated herein in its entirety by reference.

FIELD

The present invention relates to semiconductor manufacturing processes, in particular methods to predict electrical characteristics and yield of substrates subject to the process.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

These tight control loops are generally based on metrology data obtained using a metrology tool measuring characteristics of the applied pattern or of metrology targets representing the applied pattern. In general the metrology tool is based on optical measurement of the position and/or dimensions of the pattern and/or targets. It is intrinsically assumed that these optical measurements are representative for a quality of the process of manufacturing of the integrated circuits.

In addition to control based on optical measurements, also e-beam based measurements may be performed; among which a so-called low voltage measurement using an e-beam tool (as offered by HMI) may be utilized. Such a low voltage contrast measurement is indicative of the quality of electrical contact between layers applied to the substrate.

Typically after all process steps have been completed each die on the substrate should be suitable to yield a functional semiconductor device (IC). In principle before further packaging of the IC is pursued each die is subject to electrical testing using various techniques, among which electrical probing. Electrical probing is normally done at multiple locations across the die, measuring multiple electrical properties (for example voltage, resistance, frequency, each parameter referred to as a specific bin code). The values of the bin codes are a good indicator of the quality of the IC; for example when a measured resistance is very high this may indicate that electrical contact between components is not achieved and hence chances are very low that the IC will be functional. If testing of the electrical properties of the substrates conveys a large number of non-functional ICs it may be assumed that the manufacturing process has a low yield.

Disadvantage of the testing at the final stage of IC production is that only after execution of all process steps it can be determined whether the yield of the process regarding delivering a minimum desired ratio of functional ICs to non-functional ICs meets certain criteria.

SUMMARY

It is an object of the inventors to address the mentioned disadvantages of the state of the art.

In a first aspect of the invention the is provided a method for predicting yield relating to a process of manufacturing semiconductor devices on a substrate, the method comprising: obtaining a trained first model which translates modeled parameters into a yield parameter, said modeled parameters comprising: a) geometrical parameters associated with one or more of: a geometric characteristic, dimension or position of a device element manufactured by the process and b) trained free parameters; obtaining process parameter data comprising process parameters characterizing the process; converting the process parameter data into values of the geometrical parameters; and predicting the yield parameter using the trained first model and the values of the geometrical parameters.

In a second aspect of the invention, there is provided a method for constructing a first model for predicting a yield parameter based on process parameter data, comprising: determining a yield probability model for a plurality of device elements of a device manufactured by a manufacturing process, each yield probability model comprising a geometric formulation which translates one or more modeled parameters into a yield probability for its corresponding device element; said modeled parameters comprising geometrical parameters and trained free parameters; and constructing said first model as a combination of the yield probability models for each of the device elements.

BRIEF DESCRIPTION OF THE DRAWINGS

Embodiments of the invention will now be described, by way of example only, with reference to the accompanying schematic drawings, in which:

FIG. 6 illustrates an overlay tree methodology (a) which aligns all subsequent layers to a first layer A, and (b) an alternative overlay tree which aligns layer C to layer B rather than layer A.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:
- a programmable mirror array. More information on such mirror arrays is given in U.S. Pat. Nos. 5,296,891 and 5,523,193, which are incorporated herein by reference.
- a programmable LCD array. An example of such a construction is given in U.S. Pat. No. 5,229,872, which is incorporated herein by reference.

Figure 1:
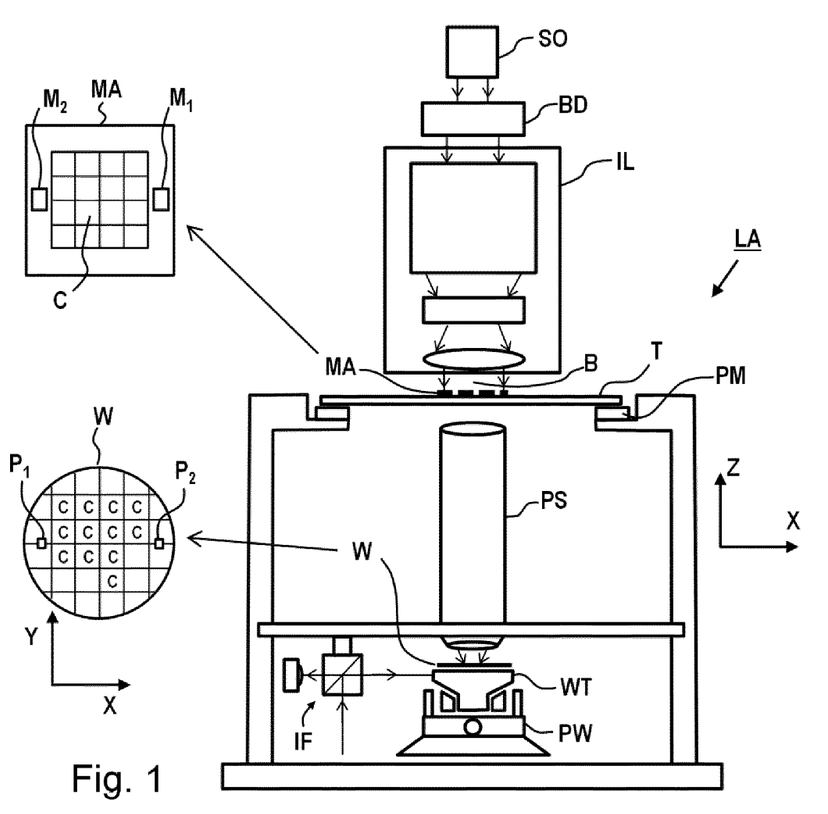
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a support structure (e.g., a mask table) MT constructed to support a patterning device (e.g., a mask) MA and connected to a first positioner PM configured to accurately position the patterning device MA in accordance with certain parameters, a substrate table (e.g., a wafer table) WT constructed to hold a substrate (e.g., a resist coated wafer) W and connected to a second positioner PW configured to accurately position the substrate in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illuminator IL receives a radiation beam from a radiation source SO, e.g. via a beam delivery system BD. The illumination system IL may include various types of optical components, such as refractive, reflective, magnetic, electromagnetic, electrostatic, or other types of optical components, or any combination thereof, for directing, shaping, or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system" PS.

The lithographic apparatus may be of a type wherein at least a portion of the substrate may be covered by a liquid having a relatively high refractive index, e.g., water, so as to fill a space between the projection system and the substrate—which is also referred to as immersion lithography. More information on immersion techniques is given in U.S. Pat. No. 6,952,253 and in PCT publication No. WO99-49504, which are incorporated herein by reference.

The lithographic apparatus LA may also be of a type having two (dual stage) or more substrate tables WT and, for example, two or more support structure MT (not shown). In such "multiple stage" machines the additional tables/structures may be used in parallel, or preparatory steps may be carried out on one or more tables while one or more other tables are being used for exposing the design layout of the patterning device MA onto the substrate W.

In operation, the radiation beam B is incident on the patterning device (e.g., mask MA), which is held on the support structure (e.g., mask table MT), and is patterned by the patterning device MA. Having traversed the mask MA, the radiation beam B passes through the projection system PS, which focuses the beam onto a target portion C of the substrate W. With the aid of the second positioner PW and position sensor IF (e.g., an interferometric device, linear encoder, 2-D encoder or capacitive sensor), the substrate table WT can be moved accurately, e.g., so as to position different target portions C in the path of the radiation beam B. Similarly, the first positioner PM and possibly another position sensor (which is not explicitly depicted in FIG. 1) may be used to accurately position the mask MA with respect to the path of the radiation beam B. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks).

Figure 2:
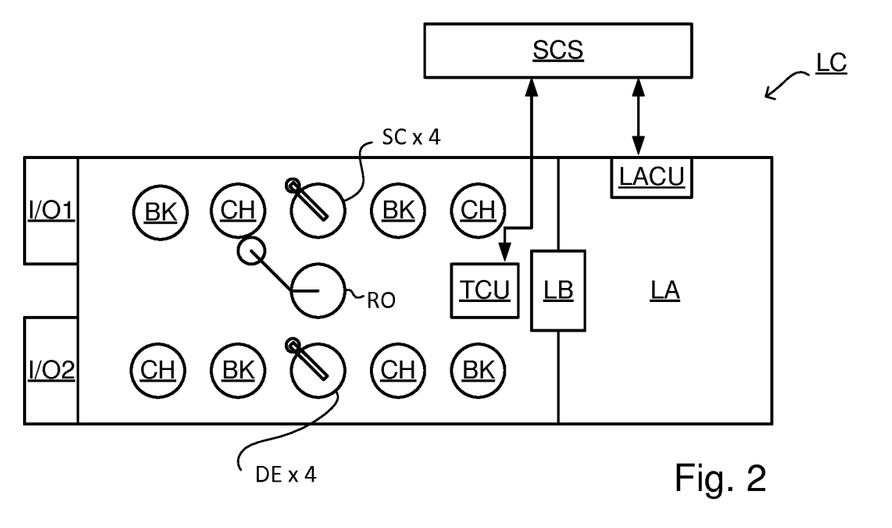
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
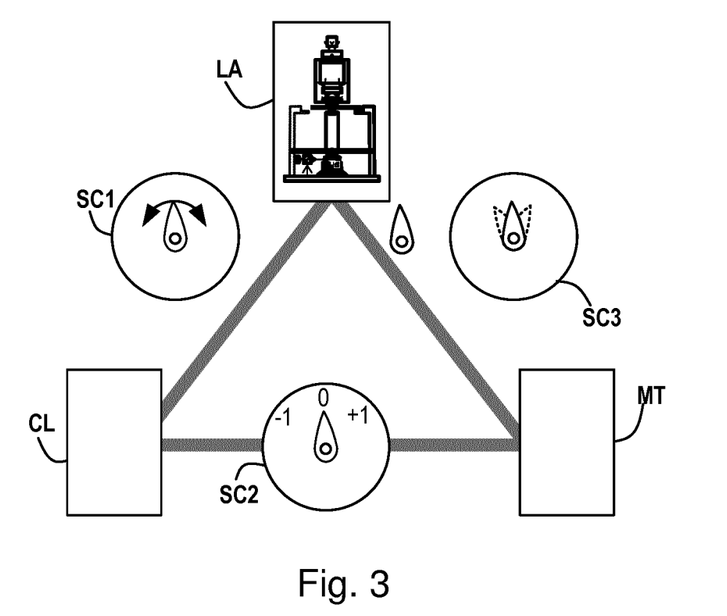
FIG. 3 depicts a schematic representation of holistic lithography, representing cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double white arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT), so as to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

The lithographic apparatus LA is configured to accurately reproduce the pattern onto the substrate. The positions and dimensions of the applied features need to be within certain tolerances. Position errors may occur due to an overlay error (often referred to as "overlay"). The overlay is the error in placing a first feature during a first exposure relative to a second feature during a second exposure. The lithographic apparatus minimizes the overlay errors by aligning each wafer accurately to a reference prior to patterning. This is done by measuring positions of alignment marks on the substrate using an alignment sensor. More information on the alignment procedure can be found in U.S. Patent Application Publication No. US20100214550, which is incorporated herein by reference. Pattern dimensioning (e.g., CD) errors may, for example, occur when the substrate is not positioned correctly with respect to a focal plane of the lithographic apparatus. These focal position errors may be associated with un-flatness of a substrate surface. The lithographic apparatus minimizes these focal positon errors by measuring the substrate surface topography prior to patterning using a level sensor. Substrate height corrections are applied during subsequent patterning to assure correct imaging (focusing) of the patterning device onto the substrate. More information on the level sensor system can be found in U.S. Patent Application Publication No. US20070085991, which is incorporated herein by reference.

Besides the lithographic apparatus LA and the metrology apparatus MT other processing apparatus may be used during IC production as well. An etching station (not shown) processes the substrates after exposure of the pattern into the resist. The etch station transfers the pattern from the resist into one or more layers underlying the resist layer. Typically etching is based on application of a plasma medium. Local etching characteristics may, for example, be controlled using temperature control of the substrate or directing the plasma medium using a voltage controlled ring. More information on etching control can be found in international Patent Application Publication No. WO2011081645 and U.S. Patent Application Publication No. US 20060016561 which are incorporated herein by reference.

During the manufacturing of the ICs, it is of great importance that the process conditions for processing substrates using processing apparatus, such as the lithographic apparatus or etching station, remain stable such that properties of the features remain within certain control limits. Stability of the process is of particular importance for features of the functional parts of the IC, i.e., the product features. To guarantee stable processing, process control capabilities need to be in place. Process control involves monitoring of processing data and implementation of means for process correction, e.g. control the processing apparatus based on characteristics of the processing data. Process control may be based on periodic measurement by the metrology apparatus MT, often referred to as "Advanced Process Control" (further also referenced to as APC). More information on APC can be found in U.S. Patent Application Publication No. US20120008127, which is incorporated herein by reference. A typical APC implementation involves periodic measurements on metrology features on the substrates to monitor and correct drifts associated with one or more processing apparatus. The metrology features reflect the response to process variations of the product features. The sensitivity of the metrology features to process variations may be different compared to the sensitivity of the product features. In that case, a so-called "Metrology To Device" offset (further also referenced to as MTD) may be determined. To mimic the behavior of product features, the metrology targets may incorporate segmented features, assist features or features with a particular geometry and/or dimension. A carefully designed metrology target should respond in a similar fashion to process variations as the product features. More information on metrology target design can be found in international Patent Application Publication No. WO 2015101458 which is incorporated herein by reference.

The distribution of locations across the substrate and/or patterning device where metrology targets are present and/or measured is often referred to as a "sampling scheme". Typically the sampling scheme is selected based on an expected fingerprint of the relevant process parameter(s); areas on the substrate where a process parameter is expected to fluctuate are typically sampled more densely than areas where the process parameter is expected to be relatively stable. However, there is a practical limit to the number of metrology measurements which can be performed, based on the allowable impact of the metrology measurements on the throughput of the lithographic process. A carefully selected sampling scheme is important to accurately control the lithographic process without affecting throughput (or at least affecting it too much) and/or assigning a too large area on the reticle or substrate to metrology features. Technology related to optimal positioning and/or measuring metrology targets is often referred to as "scheme optimization". More information on scheme optimization can be found in international Patent Application Publication No. WO 2015110191 and the European patent application, application number EP16193903.8 which are incorporated herein by reference.

The term fingerprint may refer to a main (systematic) contributor ("latent factor") of a measured signal, and in particular a contributor connected to the performance impact on-wafer or to previous processing steps. Such a fingerprint can refer to substrate (grid) patterns (e.g. from alignment, leveling, overlay, focus, CD), field patterns (e.g., from intrafield alignment, leveling, overlay, focus, CD), substrate zone patterns (e.g., outermost radius of wafer measurements) or even patterns in scanner measurements related to wafer exposure (e.g., heating signature through-lot from reticle alignment measurements, temperature/pressure/servo profiles, etc.). Fingerprints may be comprised within a fingerprint collection, and may be encoded homogenously or heterogeneously therein.

In addition to metrology measurement data, context data may be used for process control. Context data may comprise data relating to one or more of: the selected processing tools (out of the pool of processing apparatus), specific characteristics of the processing apparatus, the settings of the processing apparatus, the design of the circuit pattern and measurement data relating to processing conditions (for example wafer geometry). Examples of using context data for process control purposes may be found in European patent application, application number EP16156361.4, and international patent application, application number PCT/EP2016/072363 which are incorporated herein by reference. Context data may be used to control or predict processing in a feed-forward manner, where the context data relates to process steps performed before the currently controlled process step. Often context data is statistically correlated to product feature properties. This enables context driven control of processing apparatus in view of achieving optimal product feature properties. Context data and metrology data may also be combined e.g. to enrich sparse metrology data to an extent that more detailed (dense) data becomes available, which is more useful for control and/or diagnostic purposes. More information on combining context data and metrology data can be found in U.S. Patent provisional, application No. 62/382,764 which is incorporated herein by reference.

As said, monitoring the process is based on acquisition of data related to the process. The required data sampling rate (per lot or per substrate) and sampling density depend on the required level of accuracy of pattern reproduction. For low-k1 lithographic processes, even small substrate-to-substrate process variations may be significant. The context data and/or metrology data should then be sufficient to enable process control on a per-substrate basis. Additionally when a process variation gives rise to variations of a characteristic across the substrate, the density of the context and/or metrology data should be sufficiently distributed across the substrate. However the time available for metrology (measurements) is limited in view of the required throughput of the process. As a result of this limitation, the metrology tool may measure only on selected substrates and/or selected locations across the substrate. The strategies to determine which substrates need to be measured are further described in the European patent applications EP16195047.2 and EP16195049.8, which are incorporated herein by reference.

In practice, it is often necessary to derive a denser map of values from a sparse set of measurement values relating to a process parameter (across a substrate or plurality of substrates). Typically such a dense map of measurement values may be derived from the sparse measurement data in conjunction with a model associated with an expected fingerprint of the process parameter. More information on modeling measurement data can be found in international Patent Application Publication No. WO 2013092106 which is incorporated herein by reference. As a semiconductor manufacturing process involves multiple processing apparatuses (lithographic apparatus, etching stations, etc.), it may be beneficial to optimize the process as a whole; e.g., take specific correction capabilities associated with individual processing apparatus into account. This leads to the perspective that control of a first processing apparatus may be (partly) based on known control properties of a second processing apparatus. This strategy is commonly referred to as co-optimization. Examples of such a strategy include joint optimization of a lithographic apparatus and a density profile of a patterning device, and joint optimization of a lithographic apparatus and an etching station. More information on co-optimization may be found in international Patent application, application No. PCT/EP2016/072852 and US. Patent provisional application No. 62/298,882 which are incorporated herein by reference.

In some process control situations, the control objective may be, for example, "number of dies in spec". This describes a yield driven process control parameter which aims to obtain a maximum number of functional products per batch of processed substrates. Typically a product is associated with a die on a substrate and, as such, yield based process control is referred to as based on a "dies-in-spec" criterion. This aims to maximize the number of dies within specification, rather than applying an averaged optimization across the substrate (e.g., a least-squares optimization based on a least squares minimization of focus difference from best focus across the substrate). As such, a "dies-in-spec" optimization may use prior knowledge of the product (the die layout) when optimizing a process parameter. A least squares optimization typically treats each location equally, without taking into account the die layout. As such, a least squares optimization may prefer a correction which "only" has four locations out-of-specification, but each in a different die, over a correction which has seven locations out-of-specification, but only affecting two dies (e.g., four defects in one die, three in another). However, as a single defect will tend to render a die defective, maximizing the number of defect-free dies (i.e., dies-in-spec) is ultimately more important than simply minimizing the number of defects per substrate. A dies-in-spec optimization may comprise a maximum absolute (max abs) per die optimization. Such a max abs optimization may minimize the maximum deviation of the performance parameter from a control target. A differentiable approximation for the max abs function could be used instead, so that the cost function is easier to solve. For this to be effective, detail such as the wafer map should be used in the optimization. To obtain a good yield-based process control, a sampling scheme for metrology measurements may benefit from measurements performed at, on or near locations which are expected to be most critical for yield and/or may be statistically most relevant to determine whether yield is affected. In addition to measuring properties of product features, the occurrence of defects may be measured to further assist in optimizing the process for optimal yield (reference defect inspection). More information on yield based control may be found in PCT patent application WO2018077651, which is incorporated herein by reference.

In addition to performing metrology measurements on pre-defined locations and substrates, there is a trend to dynamically allocate the locations and substrates which need to be selected for measurement. An example of dynamically selecting substrates for measurements is described in PCT patent application WO2018072962 which is incorporated herein by reference. More information on dynamic selection of measurement locations (e.g., sampling schemes) may be found in PCT patent application WO2017140532 which is incorporated herein by reference.

A relatively new technology area is the domain of machine learning. Methods relating to this technology are nowadays used to improve prediction of process parameters based on recognition of patterns present within the acquired data (measurements and context data). Additionally machine learning techniques may be useful to guide the user in selecting the data that is most useful for process control purposes.

Electrical measurement data is typically obtained after processing of substrates. Typically, when performing electrical metrology to obtain the electrical measurement data, all the dies on the substrates are measured using probes which make (near) contact to the circuits formed during the processing. Various types of measurements may be performed; voltage, current, resistance, capacitance and inductance measurements, for example. These measurements may be performed under different conditions (frequencies, voltage, current for example) and at a plurality of locations across the die. The electrical measurement may comprise an evaluation of whether a particular structure/feature or device is functional (e.g., within specification). Alternatively, or in addition, the electrical measurement may be categorized according to "bin codes". An electrical measurement associated with a certain measured parameter (current, voltage, resistance, capacitance, inductance) at a certain condition is commonly referred to as a separate "bin code". Hence a typical electrical measurement across a die may be represented by a plurality of graphs, each graph representing a spatial distribution of values associated with a particular bin code. Throughout the text, "bin code" and "electrical characteristic" is used synonymously such that a value of a bin code associated with the substrate is referred to as a value of an electrical characteristic of the substrate. Electrical measurement data may also comprise bit asymmetry data or any other yield parameter.

The distribution of the measurement locations for which the electrical measurements need to be performed may not be constant, but may also depend on the relative position of the die on the substrate. Dies at the edge of the substrate may be more likely to have electrical defects, hence these dies may be sampled more densely than dies closer to the center of the substrate. Analogously, critical regions may be present within a die, such as those associated with functional logic structures, while less critical regions may be present, for example, at the periphery of the die. It is advantageous to provide denser electrical measurement sample schemes at the critical regions of the dies than at the less demanding regions.

The properties (minimum value, maximum value, variance or any other statistical measure) of the measured electrical characteristics are important indicators regarding the probability that a certain circuit on a die will be functional. Hence a strong relationship exists between the electrical characteristic and the yield of the process. Hence for yield control, electrical characteristic measurements are indispensable. However, they are also time consuming and are only performed at the end stage of the semiconductor manufacturing process (e.g. when options for correcting non-functional circuits are virtually absent).

To provide better yield correction capability to a semiconductor manufacturing process, it is proposed to predict the yield of a substrate based on data which is already available during the processing. During processing of the substrate multiple layers are deposited, patterned and etched. It is vital that patterns (features) provided on the substrate have well-defined properties in order to yield a functional device. For example features should be imaged at the correct focus position, have the correct critical dimensions (CD), correct edge placement (i.e., minimal edge placement error EPE) and have good overlay (i.e., each layer being aligned accurately to features associated with underlying layers). As stated previously, the lithographic apparatus (e.g., alignment system, leveling system) and the metrology apparatus (e.g., scatterometer or e-beam tool) play an important role in measuring these parameters, in some cases for all substrates within a lot.

Figure 4:
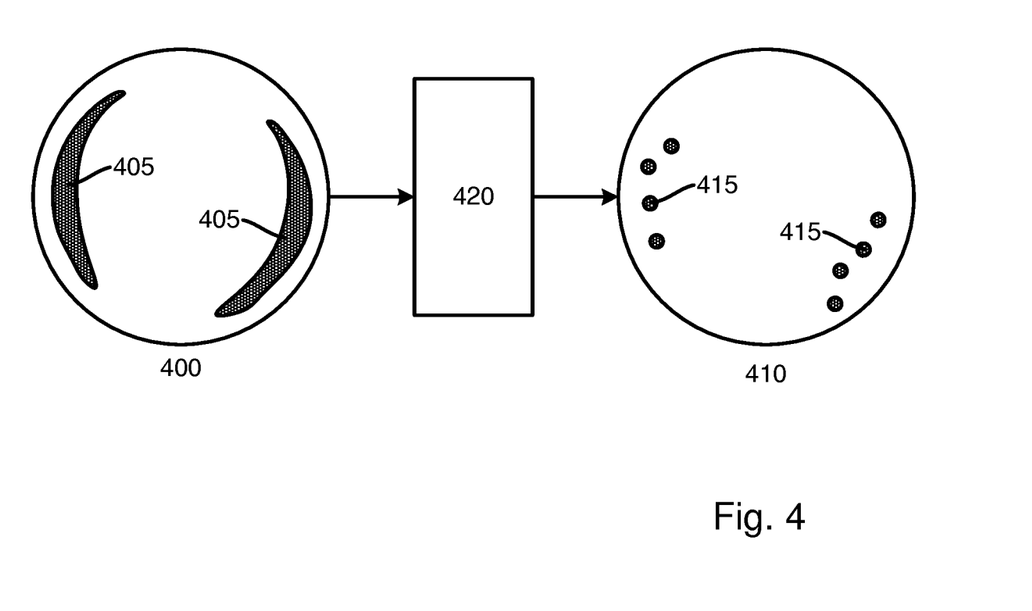
FIG. 4 is a schematic illustration of the determination of a relationship between a measured process characteristic and electrical probe data.

It is expected that the results of the metrology measurements (the metrology data) will be representative for a certain characteristic of the process, which in turn is expected to be closely related to the electrical characteristics that will be measured during probe testing. FIG. 4 is a schematic illustration of the determination of a relationship between a measured process characteristic and electrical probe data. The figure shows a process fingerprint 400 of the process characteristic, showing shaded regions 405 where the process characteristic is significantly out of specification. By way of specific example, the process characteristic may be focus and the fingerprint may be a focus error fingerprint associated with the substrate as obtained from level sensor data (e.g., from the lithographic apparatus/scanner). In such an example, the shaded regions show areas associated with large leveling error. Also shown is corresponding electrical probe data 410. Here the shaded circles 415 indicate out of specification probe measurements. As such, FIG. 4 demonstrates schematically that the process fingerprint 400 typically correlates with the electrical probe data 410. Also shown is a proposed data analysis step 420. The data analysis step 420 maps the process fingerprint 400 to the electrical probe data 410.

It will be appreciated that focus/leveling data is only one example of a process characteristic data. The process characteristic may comprise any measurable characteristic which affects yield. The process characteristic may be measured using, for example, a lithographic apparatus, another metrology apparatus, or another processing apparatus. For example when measuring an overlay fingerprint using a metrology device such as a scatterometer, it is expected that the locations on the substrate having large overlay errors will correlate strongly with deviating (out of specification) electrical characteristic measurements (e.g., due to sub-optimal electrical contact of the layers on the substrate) and therefore non-functional devices. The underlying process characteristic causing this specific overlay fingerprint may, for example, be an annealing step performed between the patterning of the two layers. In addition to deforming the substrate (thereby causing the overlay error), electrical conductance of material may be affected during the annealing step, resulting in an additional contribution to an expected impact on the electrical characteristic measurements.

The process characteristic may further be determined using fingerprint decomposition techniques. When measuring an overlay fingerprint it may be beneficial to decompose the fingerprint into, for example, pre-defined shapes. The pre-defined shapes may be selected based on a priori knowledge of certain characteristics of the processing steps and/or processing tools. A common technique to decompose fingerprints uses Principal Component Analysis (PCA) or an eigenvalue decomposition method. Instead of utilizing the directly measured fingerprint of the parameter of interest (for example overlay), separate components of the fingerprint are considered. PCA (and Independent Component Analysis (ICA)) methods within this context are described in WO2015049087, which is incorporated herein by reference.

It is therefore proposed to use metrology data obtained at any stage during the processing of the substrate for process control based on maximizing yield, rather than minimizing a process parameter error. Basing control on a minimization of a process parameter error comes at a cost; it imposes heavy weights on extreme deviations from zero for the process parameters, focusing on minimizing those large errors. At the same time, if many dies have a small, but non-zero, process parameter error, it will work to improve all of these small errors (none of which actually having a yield impact), potentially at the cost of a greater error for one die, thereby resulting in the loss of that die for no real benefit. Ultimately, yield is the important metric which should be optimized above all else.

Up to now, no reliable, predictive yield model has been available. In electronic design automation (EDA), models of electrical properties do exist, but they are usually idealized and do not properly mirror real process conditions. The goal is to develop a yield prediction model that can translate metrology and control actions into predicted yield which can be used for control. It is proposed to combine modeling of the device electric properties, process variations and process control actions, big data from a fabrication plant (fab) and machine learning, to develop a model which is sufficiently good at predicting yield for use in process control.

A yield prediction system will now be described, which uses a yield determining design and metrology input to drive process manufacture control (e.g., lithography apparatus/scanner, etcher, metrology device(s) and/or any other manufacturing apparatus used in an IC manufacturing process) in order to achieve optimal yield and minimize systematic yield loss.

The yield prediction system may be developed using input or training data comprising:
Design information; e.g., through-stack design information. This may include reticle design information and/or models used (e.g., lithography and/or process models);
Metrology control trees e.g., overlay control trees and alignment trees;
inline metrology data such as scatterometry data, e-beam or SEM data.
Final electrical measurement (e-test) data, such as die level probe, bit-asymmetry.

The output may comprise a calibrated yield prediction system which is capable of predicting e-test results using inline metrology data and lithography (or other manufacturing apparatus) control actions. The output may also comprise an expected process window for metrology (e.g., overlay, CD, EPE, focus etc.) for verifying validity of applied corrections in a control loop.

Figure 5:
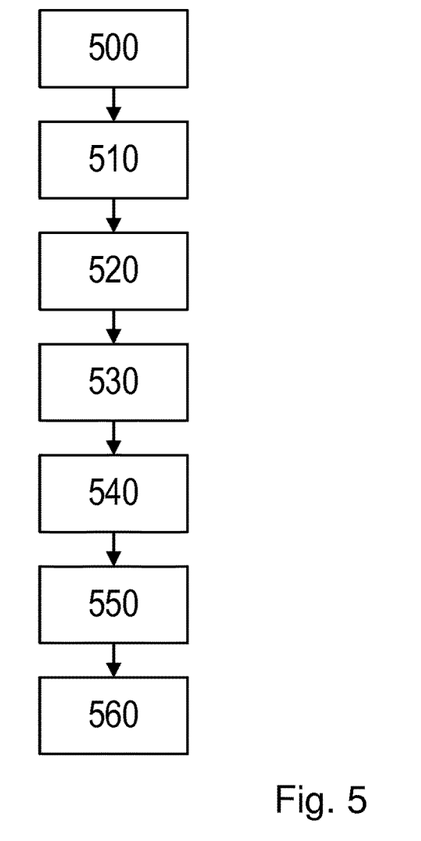
FIG. 5 is a flowchart of a method according to a first embodiment of the invention.

FIG. 5 is a flowchart describing a method for developing a first model or semi-whitebox model in accordance with the above. This model is described as a semi-whitebox model, as the model comprises a level of device physics, which is based on geometric information only. The missing physics is accounted for by training one or more free parameters of the geometric model.

At step 500, for each reticle layer, critical or weak patterns are identified. This may be achieved by performing a simulation e.g., a full chip simulation such as LMC (Lithography Manufacturability Check), to identify "hot spots" which are particularly sensitive to process variations for one or more process parameters such as dose, focus, overlay etc. (e.g., have a relatively small/narrow process window for one or more of these process parameters). LMC is a known full-chip verification method. It applies a set of models (e.g., the models used in optical proximity correction (OPC)) to predict CD (on the substrate) across a field. Its major purpose is to highlight critical patterns in the field before a photomask order is sent to a mask shop. In addition it enables pull out of design regions that are sensitive to process condition variation. LMC basically comprises a comparison of the simulated full-chip resist contour against the design target. Note that an OPC model (thus an LMC model) is typically constructed for one particular process, for one particular optical condition (scanner).

At step 510, for each pattern identified at step 500 to be a critical pattern or hotspot, an initial model or geometric model is built which translates measured process parameters (e.g., focus/dose/overlay) into modeled parameters. The modeled parameters may comprise parameters which are directly related to yield, for example, geometric characteristics and dimensions such as CD, profile, and inter-layer relationships such as overlay, and further comprise one or more free parameters. The free parameters may comprise parameters which relate the measured process/performance parameters to the yield relevant parameters, such as the geometric characteristics and dimensions. For example, focus can be translated into CD via a quadratic model with one or more coefficients as the free parameters.

At step 520, a device-level yield probability model is built for each pattern identified at step 500. Such a yield probability model may be built using a geometric formulation which translates the modeled parameters determined in the previous step (e.g., geometric dimensions: CD, profile (such as a sidewall angle of the feature of interest), interlayer relationships such as overlay between two or more layers) into a yield parameter (e.g., a yield probability). The yield probability model may comprise a simple connectivity model, which translates the geometry information into electrical yield probabilities, e.g., electrical "open" and "short" probabilities, having tunable free parameters. Such a model may determine the probability of a particular pattern or area comprising an "open" and/or "short". By way of specific example, a metal and via overlap area may be translated by the model as being "open" with an associated (e.g., Gaussian) probability function. In this step, the free parameter(s) may comprise mean and/or standard deviation of the/each (e.g., Gaussian) probability function. Such probability functions, once calibrated, can be used to calculate a product process window; e.g., by determining synthetic data and using this synthetic data for simulated control of a process to check validity of the calibration.

At step 530, a die yield prediction model (i.e., the semi-whitebox model) is built based on individual device yield probability determined at step 520. A simple model may comprise, by way of example, determining that the die will yield only if x % of the (e.g., critical or modeled) device patterns will yield, where x is a tunable parameter.

At step 540, the semi-whitebox model is trained by training of the free parameters, based on training data (input data), so that the model can predict the final electrical measurement (e-test) data based on the other input data (e.g., design information, overlay control trees/alignment trees and inline metrology data).

At step 550, the trained semi-whitebox model is used to predict yield based on process parameter values from inline metrology (e.g., overlay and focus/dose measurements) and/or computational metrology. First these process parameter values are translated these into geometric parameters (e.g., using the geometric models developed at step 510, or otherwise). The semi-whitebox model, with the corresponding free parameters now trained, will predict yield (and/or other electrical characteristics) based on the derived geometric parameters. In an embodiment, this step comprises using a control model or shadow mode control simulation model to incorporate the effect of different control actions. The shadow mode control simulation model predicts one or more of the process parameters (e.g., dose/focus/overlay etc.) as different control actions are applied/varied, and the semi-whitebox model predicts yield (e.g., via derived geometric parameters) for said control actions based on the output of the shadow mode control simulation model.

Note that the semi-whitebox model can be enhanced to go beyond open/short determination so as to include other electrical characteristics or electrical measurement parameters e.g., electrical and timing properties, such as capacitance, resistance and conductance (e.g., categorize according to bin code).

In an embodiment, at step 560, the first model (semi-whitebox model) can be used to produce synthesized data to impose constraints on a second model (e.g., a blackbox model). The blackbox model may comprise a neural network (e.g., a convolutional neural network (CNN)) or similar).

There are a couple of reasons for training an intermediate semi-whitebox model, rather than simply training a blackbox or CNN model directly from the input data. Firstly, a CNN model contains no physics and as a consequence requires huge volumes of data to constrain its behavior. Usually the metrology data available is insufficient to achieve this. The proposed semi-whitebox model does contain physics and therefore can produce large amount of (e.g., synthetic) data to constrain the parameter space of the blackbox model within the physics limited domain. Secondly, there are certain metrology limitations, in particular in terms of sampling. It is often not possible to measure certain structures in certain locations. By using the semi-whitebox model it is possible to provide such missing metrology. When training the blackbox model, greater weighting may be given to the actual metrology data over training data generated by the semi-whitebox model. It should be appreciated that the semi-whitebox model will have accuracy limitations which the training process should account for, and which are not applicable to the actual measurement data. There are a number of well-established techniques in the machine learning domain to do this, as will be apparent to the skilled person.

The proposed first model and/or second model can be used to make inline predictions of die-level yield per design. These predictions can be used, in turn, to drive lithography or process control to achieve better yield.

It was mentioned that the input data may comprise metrology control trees such as alignment trees and/or overlay trees. The alignment tree is a part of the lithographic process control recipe that determines, for a new layer, which previous layer's alignment marks should be used to position the pattern being applied in a new layer. Often potentially suitable alignment marks could be found in more than one layer. Where there is a choice of alignment marks on the substrate, and where there is a choice of settings of an alignment sensor, these choices are typically defined in an alignment recipe. The alignment recipe therefore defines how positions of alignment marks to be measured, as well as which marks. The set of alignment recipes for all the layers form the alignment tree.

In the same way as there is an alignment tree defining the measurement of alignment prior to applying a pattern to a given layer, so there is an overlay tree, defining the measurement of overlay to be made when measuring performance of the process after that layer has been patterned. With overlay trees, in contrast to alignment trees, it should be appreciated that layer choice is very important also. An alignment target can be reused between layers but an overlay target cannot. In an example, for at least an experimental substrate, it may be supposed that each of these targets is provided in a variety of types, one of which may be optimal in one set of circumstances and another may be optimal in another. Therefore, there may be a choice of two overlay targets for measuring overlay between those two layers. These targets can be made of different types, and experiments performed to determine which provides the better measurement in the real process.

Overlay and alignment trees are potentially very complex with multi patterning and complex multilayer devices used in modern logic and memory IC devices. With this complexity comes many additional masks, particularly in the quadruple patterning era. In techniques such as self-aligned double patterning, the structures being constructed are themselves used to build yet more structures forming the device, further complicating the overlay problem. This is in addition to issues such as interfering layers and absorbing layers complicating optical overlay metrology. The devising of optimized alignment and overlay trees for processes which are much more complex than previously used, therefore, takes an increasingly long time.

Overlay control is a critical driver of yield. Developing and optimizing an alignment and overlay tree can take a long time and may not produce optimal overlay control. More rapid and accurate overlay control is strongly desired in IC process development. However, controlling for the most accurate overlay control on any given layer pair does not necessarily result in an overlay and/or alignment tree which maximizes yield potential in the presence of a real device, requiring a compromise between the accuracy of the metrology, the precision of the metrology, and the electrical requirements of the device. This is further complicated, as the electrical sensitivity of a device may involve interactions between multiple layers, thereby forcing a further compromise. Such a compromise is difficult to achieve because of its complexity and because the expertise to solve the problem is usually not held by a single person, but typically requires a team of people with very different skill sets. Herein is described a method to automate this process using statistics, machine learning, and shadow mode simulation.

Developing and optimizing an alignment tree and/or overlay tree can take a long time and may not produce optimal overlay control. Current methodology often involves selecting critical layers based on the electrical properties of the device, and then checking if it is possible to make a qualifying mark on all such layers. In the event that such a target is not available due to overlay limitations, alternative strategies are tried, such as aligning overlay targets to other layers or other approaches.

Figure 6:
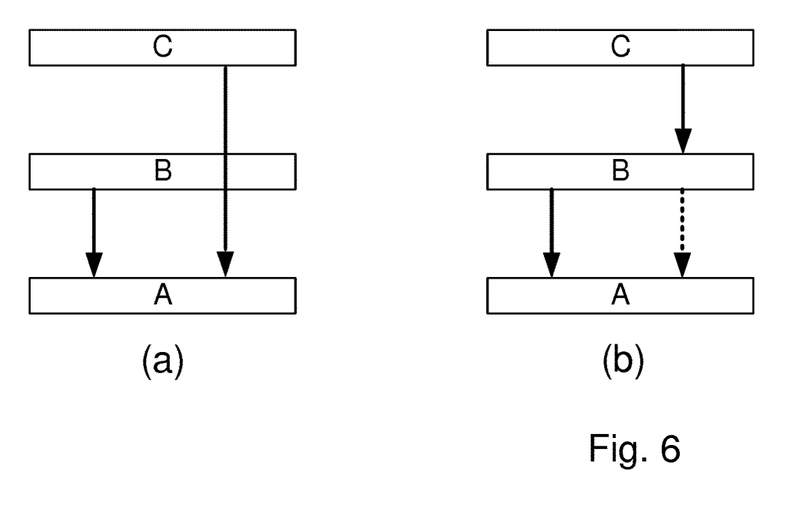

FIG. 6(a) illustrates an example of a current overlay alignment tree definition strategy, where both layer B and layer C each align to layer A. In the proposed methodology, yield sensitivity for different overlay and/or alignment strategies can be simulated and yield predicted based on alternative overlay and/or alignment trees. By way of a specific example illustrated at FIG. 6(b), layer B may comprise a simulated, virtual overlay and/or alignment layer. The overlay $OV_{CB}$ for layers C and B equals the difference between the overlay $OV_{CA}$ for layers C and A and overlay $OV_{BA}$ for layers B and A; i.e.:

$$OV_{CB}=OV_{CA}-OV_{BA}$$

Based on yield analysis through a machine learning model, it can be determined whether such an overlay alignment tree can improve yield compared with a current overlay alignment tree; i.e., in the specific example, it can be evaluated whether layer C should align to layer B instead of layer A to improve yield.

As such, the method described by FIG. 5 can also train the semi-whitebox model to predict yield taking into account metrology control trees (alignment trees and/or the overlay trees); for example, based on input metrology control trees. This enables the model to also optimize the metrology control trees. In such an embodiment, simulated and/or measured process parameter data (control tree data) describing the effect of variation of metrology control trees on the process parameter data is obtained. This control tree data can then be used as part of the training data for training the semi-whitebox model to evaluate the effect of a metrology control tree on yield. As an alternative, a blackbox model can be directly trained to predict yield taking into account metrology control trees.

A further embodiment may comprise simulation of signal detectability to the yield prediction such that the output results in a yield prediction for each metrology control tree, along with a corresponding signal detectability score from which it can be determined whether the metrology control tree is feasible in terms of its measurement detectability as well as yield. Such a simulation may be performed in parallel to using the semi-whitebox model and/or blackbox model to infer yield probability and/or other electrical parameters. Alternatively, the signal detectability simulation could be incorporated into the actual semi-whitebox model and/or blackbox model. For example, it can be used either to mark certain trees as non-viable (simple case), or as input to the reliability of the overlay/alignment in terms of accuracy/precision (complex case), taken into account during the white-box or black-box modeling. By way of a more specific example, if the overlay has high noise, this should be taken into account when final yield is predicted. This can be used both to rule out bad targets/layers, as well as to enhance the accuracy of the final yield predictions.

It is also possible, in a separate embodiment, to create virtual overlay and/or alignment trees based on a dedicated machine learning yield model. These virtual overlay and/or alignment trees can be used directly to determine an optimal overlay and/or alignment recipe for a particular process, which optionally also considers target detectability. In an embodiment, the various virtual overlay and/or alignment trees can then be used to generate overlay data (or other performance data), based on simulated or a combination of simulated and measured data (e.g., in a shadow mode). The yield can then be deduced using either a blackbox model or the semi-whitebox model of FIG. 5; the model simulated to have optimal yield can be selected as the optimal overlay and/or alignment tree.

It is therefore proposed to create an optimal virtual metrology control tree based on a machine learning yield probability function. Such a method may optimize yield using a learned yield function mapping the process window. In such an embodiment, the process window and yield function are learned rather than assumed or measured by proxy. Different virtual control trees result in different yield functions, and different final device yields. Yield optimization may be performed for all layers, such that, for example, the yield function notes that dies lost on an earlier layer have no chance of yielding, and will therefore be willing to sacrifice these dies in other layers to save other dies which still may yield, in later steps. Likewise, dies with a low chance, or a medium chance, of yielding will have their requirements balanced against earlier level performance, and potentially also future level performance if average performance is known in advance. In this way, it is possible to optimize the metrology control tree after the fact, as described above, using indirectly determined overlay and a shadow mode, with real yield data.

The yield probability function is essentially a computationally determined yield as a function of process window parameters; e.g., describing yield as a function of position within the process window for one or more parameters. The yield probability function can be parametric or non-parametric. The process window parameter is not limited to the process parameter(s) on any given length scale, but rather may be extended to include any number of features. The idea is to determine alternative overlay and alignment trees that can optimize yield, which is calculated or measured from a yield probability function, as described.

Additionally, it is possible to simulate signal detectability in the metrology control tree optimization, such that proposed tree will result in improved yield with guaranteed alignment and overlay target detection. In this manner, it is not only possible to optimize an overlay and/or alignment tree for a product after the fact as described above, using indirect overlay with shadow mode and real yield data, it is also possible to simulate the overlay and/or alignment tree and detectability from a proposed device perspective, allowing an initial optimized overlay and/or alignment tree for a device prior to it being printed, or optimize a different overlay/alignment tree after the device has been designed.

The methods described herein can be used in a process control strategy. Such process control is typically coordinated by a controller being a computing device in connection with one or more of the apparatus participating within the semiconductor manufacturing process (etching device, scanner, etc.). Alternatively the controller is a module built in one of the apparatus or metrology tools. The process control may determine corrections and/or vary any aspect of control of the manufacturing process and/or any manufacturing apparatus based on the yield predictions and/or use any of the described models (e.g., in combination with metrology data) to determine any control strategy which optimizes yield (while optionally taking into account other factors such as signal detectability).

Further embodiments of the invention are disclosed in the list of numbered clauses below:

1. A method for predicting a yield parameter relating to a manufacturing process, the method comprising: obtaining a trained first model which translates modeled parameters into said yield parameter, said modeled parameters comprising geometrical parameters and trained free parameters; obtaining process parameter data related to one or more process parameters of said process; and predicting the yield parameter based on the process parameter data and trained first model.

2. A method according to clause 1, wherein the yield parameter describes a measure of the probability that a device, or element thereof, manufactured by the manufacturing process will function.

3. A method according to clause 1 or 2, wherein the yield parameter describes an electrical characteristic associated with a resistance, inductance or capacitance of a device, or element thereof, manufactured by the manufacturing process.

4. A method according to any preceding clause, comprising converting said process parameter data into said geometrical parameters using one or more geometric models prior to predicting the yield parameter.

5. A method according to any preceding clause, wherein the process parameter data relates to one or more process parameters measurable using inline metrology.

6. A method according to any preceding clause, wherein said one or more process parameters comprise one or more of overlay, alignment, leveling, focus or dose.

7. A method according to any preceding clause, wherein the process parameter data relates to variation in a metrology control tree, such that said yield parameter is dependent on the metrology control tree.

8. A method according to clause 7, wherein the metrology control tree may comprise an overlay tree and/or an alignment tree.

9. A method according to clause 7, comprising performing a signal detectability simulation relating to a metrology action described by the metrology control tree, to determine a measure of signal detectability corresponding to said yield parameter.

10. A method according to any preceding clause, wherein said trained first model relates to one or more device elements of a device manufactured by the manufacturing process, which are identified as being relatively process sensitive.

11. A method according to any preceding clause, comprising the initial step of constructing the first model prior to it being trained to obtain said trained first model, said initial step comprising:
determining a yield probability model for each of one or more device elements of a device manufactured by the manufacturing process, each yield probability model comprising a geometric formulation which translates said modeled parameters into a yield probability for its corresponding device element.

12. A method according to clause 11, wherein said one or more device elements comprise those which have been identified as being relatively process sensitive.

13. A method according to clause 12, comprising a step of determining the device elements which are relatively process sensitive.

14. A method according to any of clauses 11 to 13, wherein each yield probability model comprises free parameters relating to statistical parameters of the probability function.

15. A method according to clause 14, wherein said statistical parameters of the probability function relate to a mean and/or a standard deviation of the probability function.

16. A method according to any of clauses 11 to 15, comprising constructing one or more geometric models which translate the process parameters into said modeled parameters prior to determining the one or more yield probability models.

17. A method according to any of clauses 11 to 16, comprising constructing said first model based on the yield probability models for each of the one or more device elements.

18. A method according to clause 17, wherein said first model comprises a combination of said yield probability models which describe a yield probability for the device.

19. A method according to clause 18, wherein said combination of said yield probability models comprises determining the yield parameter based on the proportion of the yield probability models for which the yield probability is determined to be yielding.

20. A method according to clause 19, wherein the proportion is a tunable parameter.

21. A method according to any of clauses 11 to 20, comprising a further step of training the first model using first training data comprising electrical measurement data and one or more of measured and/or simulated process parameter data, metrology control trees, and design information.

22. A method according to clause 21, wherein said metrology control trees comprising overlay trees and/or alignment trees which describe at least the targets measured in an overlay or alignment process respectively, the method comprising obtaining simulated and/or measured control tree data describing the effect of variation of metrology control trees on the process parameter data, and said first training data comprises said control tree data for training the first model to evaluate the effect of a metrology control tree on said yield parameter.

23. A method according to any preceding clause, comprising using a control model in combination with the trained first model, said control model predicting the effect of variation of one or more control actions on one or more of said process parameters, the output of the control model being input into said trained first model for predicting the yield parameter.

24. A method according to any preceding clause, comprising using the trained first model to predict the yield parameter on a production substrate.

25. A method according to any of clauses 1 to 23, comprising using the first model to generate second training data for training a second model, said second training data comprising predicted yield parameters based on various process parameter data.

26. A method according to clause 25, wherein said second model comprises a blackbox model such as a neural network.

27. A method according to clause 25 or 26, comprising using the second model to predict the yield parameter on a production substrate.

28. A method according to any preceding clause comprising performing a control action for control of said manufacturing process based on the predicted yield parameter.

29. A method according to any preceding clause wherein said modeled parameters comprise only geometrical parameters and trained free parameters.

30. A method for constructing a first model for predicting a yield parameter based on process parameter data, comprising:
determining a yield probability model for a plurality of device elements of a device manufactured by a manufacturing process, each yield probability model comprising a geometric formulation which translates one or more modeled parameters into a yield probability for its corresponding device element; said modeled parameters comprising geometrical parameters and trained free parameters; and
constructing said first model as a combination of the yield probability models for each of the device elements.

31. A method according to clause 30, wherein said modeled parameters comprising only geometrical parameters and trained free parameters.

32. A method according to clause 31, wherein said one or more device elements comprise device elements which have been identified as being relatively process sensitive.

33. A method according to clause 32, comprising a step of determining the device elements which are relatively process sensitive.

34. A method according to any of clauses 31 to 33, wherein each yield probability model comprises free parameters relating to statistical parameters of the probability function.

35. A method according to clause 34, wherein said statistical parameters of the probability function relate to a mean and/or a standard deviation of the probability function.

36. A method according to any of clauses 31 to 35, comprising constructing one or more geometric models which translate the process parameters into said modeled parameters prior to determining the one or more yield probability models.

37. A method according to any of clauses 30 to 36, wherein said combination of said yield probability models comprises determining the yield parameter based on the proportion of the yield probability models for which the yield probability is determined to be yielding.

38. A method according to clause 37, wherein the proportion is a tunable parameter.

39. A method according to any of clauses 30 to 38, comprising a further step of training the first model using first training data comprising electrical measurement data and one or more of measured and/or simulated process parameter data, metrology control trees, and design information.

40. A method according to clause 39, wherein said metrology control trees comprising overlay trees and/or alignment trees which describe at least the targets measured in an overlay or alignment process respectively, the method comprising obtaining simulated and/or measured control tree data describing the effect of variation of metrology control trees on the process parameter data, and said first training data comprises said control tree data for training the first model to evaluate the effect of a metrology control tree on said yield parameter.

41. A computer program comprising program instructions operable to perform the method of any of clauses 1 to 40, when run on a suitable apparatus.

42. A non-transient computer program carrier comprising the computer program of clause 41.

43. A processing system comprising a processor and the computer program of clause 41.

44. A metrology system comprising:
a substrate holder for a substrate;
an illumination source for illuminating a structure on the substrate with radiation;
a sensor for sensing scattered illumination from the structure; and
the processing system of clause 43 operable to:
derive one or more values for one or more process parameters from the sensed scattered illumination; and
predict a yield parameter based on the derive one or more values for the one or more process parameters.

45. A lithographic cell comprising the metrology system of clause 44 and one or more integrated manufacturing apparatuses, said lithographic cell being operable to determine and apply a control action for a manufacturing process based on the predicted yield parameter.

46. A lithographic cell according to clause 45, wherein the control action is operable to optimize predicted yield.

47. A method for predicting yield relating to a process of manufacturing semiconductor devices on a substrate, the method comprising:
obtaining a trained first model which translates modeled parameters into a yield parameter, said modeled parameters comprising: a) geometrical parameters associated with one or more of: a geometric characteristic, dimension or position of a device element manufactured by the process and b) trained free parameters;
obtaining process parameter data comprising process parameters characterizing the process;
converting the process parameter data into values of the geometrical parameters; and
predicting the yield parameter using the trained first model and the values of the geometrical parameters.

48. A method according to clause 47, wherein the yield parameter is a measure of the probability that a device, or element thereof, manufactured by the process will function.

49. A method according to clause 47 or 48, wherein the geometrical parameters comprise one or more of: Critical Dimension (CD), overlay, sidewall angle or any other parameter associated with a geometric profile of the device element.

50. A method according to clause 47, 48 or 49, wherein the process parameters relate to one or more of overlay, alignment, leveling, focus or dose.

51. A method according to any of clause 47 to 50, wherein the process parameter data relates to variation in an alignment and/or overlay tree, such that said yield parameter is dependent on the overlay tree and/or alignment tree.

52. A method according any of clause 47 to 51, wherein said trained first model relates to one or more device elements of a device manufactured by the process, which are identified as being sensitive to process variations.

53. A method according to any of clause 47 to 52, further comprising an initial step of constructing the first model prior to it being trained to obtain said trained first model, said initial step comprising:

determining a yield probability model for one or more device elements of a device manufactured by the process, each yield probability model comprising a geometric formulation which translates said modeled parameters into a yield probability for its corresponding device element.

54. A method according to clause 53, wherein each yield probability model comprises free parameters relating to statistical parameters of the probability function.

55. A method according to any of clause 47 to 54, further comprising using the first model to generate second training data for training a second model, said second training data comprising predicted yield parameters based on previous process parameter data.

56. A method according to clause 55, wherein said second model comprises a neural network.

57. A method according to any of clause 47 to 56, further comprising performing a control action for control of said process based on the predicted yield parameter.

58. A method for constructing a first model for predicting a yield parameter based on process parameter data, comprising:
determining a yield probability model for a plurality of device elements of a device manufactured by a manufacturing process, each yield probability model comprising a geometric formulation which translates one or more modeled parameters into a yield probability for its corresponding device element, said modeled parameters comprising geometrical parameters and trained free parameters; and
constructing said first model as a combination of the yield probability models for each of the device elements.

59. A method according to clause 58, wherein each yield probability model comprises free parameters relating to statistical parameters of the probability function.

60. A computer program comprising program instructions operable to perform the method of any of clause 47 to 59, when run on a suitable apparatus.

61. A non-transient computer program carrier comprising the computer program of clause 60.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A method comprising:
obtaining a trained first model which translates modeled parameters into a yield parameter relating to a process of manufacturing semiconductor devices on a substrate, the modeled parameters comprising: a) one or more geometrical parameters associated with one or more selected from: a geometric characteristic, dimension or position of a device element manufactured by the process and b) one or more trained free parameters;
obtaining process parameter data comprising data of one or more process parameters characterizing the semiconductor manufacturing process;
converting the process parameter data into values of the one or more geometrical parameters; and
predicting the yield parameter using the trained first model and the values of the one or more geometrical parameters.

2. The method according to claim 1, wherein the yield parameter is a measure of probability that a device, or element thereof, manufactured by the process will function.

3. The method according to claim 1, wherein the one or more geometrical parameters comprise one or more selected from: Critical Dimension (CD), overlay, sidewall angle or any other parameter associated with a geometric profile of the device element.

4. The method according to claim 1, wherein the one or more process parameters relate to one or more selected from: overlay, alignment, leveling, focus or dose.

5. The method according to claim 1, wherein the process parameter data relates to variation in an alignment and/or overlay tree, such that the yield parameter is dependent on the overlay tree and/or alignment tree.

6. The method according to claim 1, wherein the trained first model relates to one or more device elements of a device manufactured by the process, which are identified as being sensitive to process variations.

7. The method according to claim 1, further comprising constructing the first model prior to it being trained to obtain the trained first model, the constructing comprising determining a yield probability model for each of one or more device elements of a device manufactured by the process, each yield probability model comprising a geometric formulation which translates the modeled parameters into a yield probability for its corresponding device element.

8. The method according to claim 7, wherein each yield probability model comprises one or more free parameters relating to one or more statistical parameters of a probability function.

9. The method according to claim 1, further comprising using the first model to generate second training data for training a second model, the second training data comprising one or more predicted yield parameters based on previous process parameter data.

10. The method according to claim 9, wherein the second model comprises a neural network.

11. The method according to claim 1, further comprising performing a control action for control of the semiconductor manufacturing process based on the predicted yield parameter.

12. A method comprising:
determining a yield probability model for each device element of a plurality of device elements of a device manufactured by a manufacturing process, each yield probability model comprising a geometric formulation which translates modeled parameters into a yield probability for its corresponding device element, the modeled parameters comprising one or more geometrical parameters and one or more trained free parameters;
constructing the first model as a combination of the yield probability models for each of the device elements; and
predicting, using the first model, a yield parameter based on process parameter data.

13. The method according to claim 12, wherein each yield probability model comprises one or more free parameters relating to one or more statistical parameters of a probability function.

14. A computer program product comprising a non-transitory computer-readable medium having instructions therein, the instructions, upon execution by a computing system, configured to cause the computing system to at least:
 obtain a trained first model which translates modeled parameters into a yield parameter relating to a process of manufacturing semiconductor devices on a substrate, the modeled parameters comprising: a) one or more geometrical parameters associated with one or more selected from: a geometric characteristic, dimension or position of a device element manufactured by a semiconductor manufacturing process and b) one or more trained free parameters;
 obtain process parameter data comprising data of one or more process parameters characterizing the semiconductor manufacturing process;
 convert the process parameter data into values of the one or more geometrical parameters; and
 predict the yield parameter using the trained first model and the values of the one or more geometrical parameters.

15. The computer program product according to claim 14, wherein the instructions are further configured to cause the computing system to construct the first model prior to it being trained to obtain the trained first model, the instructions to construct the first model are further configured to cause the computing system to determine a yield probability model for each of one or more device elements of a device manufactured by the semiconductor manufacturing process, each yield probability model comprising a geometric formulation which translates the modeled parameters into a yield probability for its corresponding device element.

16. The computer program product according to claim 14, wherein the instructions are further configured to cause the computing system to use the first model to generate second training data for training a second model, the second training data comprising one or more predicted yield parameters based on previous process parameter data.

17. The computer program product according to claim 16, wherein the second model comprises a neural network.

18. The computer program product according to claim 14, wherein the instructions are further configured to cause the computing system to cause performance of a control action for control of the semiconductor manufacturing process based on the predicted yield parameter.

19. A computer program product comprising a non-transitory computer-readable medium having instructions therein, the instructions, upon execution by a computing system, configured to cause the computing system to at least:
 determine a yield probability model for each device element of a plurality of device elements of a device manufactured by a manufacturing process, each yield probability model comprising a geometric formulation which translates modeled parameters into a yield probability for its corresponding device element, the modeled parameters comprising one or more geometrical parameters and one or more trained free parameters;
 construct a first model for predicting a yield parameter based on process parameter data, as a combination of the yield probability models for each of the device elements; and
 predict, using the first model, a yield parameter based on process parameter data.

20. The computer program product according to claim 19, wherein each yield probability model comprises one or more free parameters relating to one or more statistical parameters of a probability function.

* * * * *

UNITED STATES PATENT AND TRADEMARK OFFICE
CERTIFICATE OF CORRECTION

PATENT NO. : 12,055,904 B2
APPLICATION NO. : 17/293373
DATED : August 6, 2024
INVENTOR(S) : Youping Zhang et al.

It is certified that error appears in the above-identified patent and that said Letters Patent is hereby corrected as shown below:

On the Title Page

Item (72) Inventors:
Please correct "Boris Menchtchikov, Cupertino, CA (US)" to "Boris Menchtchikov, Redwood City, CA (US)".
Please correct "Cyrus Emil Tabery, Redwood City, CA (US)" to "Cyrus Emil Tabery, San Jose, CA (US)".

Item (60) Related U.S. Application Data:
Please include "Provisional Application No. 62/774,488, filed on December 3, 2018".

Signed and Sealed this
Eleventh Day of February, 2025

Coke Morgan Stewart
*Acting Director of the United States Patent and Trademark Office*